Nov. 10, 1970　　　　H. E. CRIBB　　　　3,540,056
VHF/UHF PARASITIC PROBE ANTENNA
Filed Sept. 6, 1967
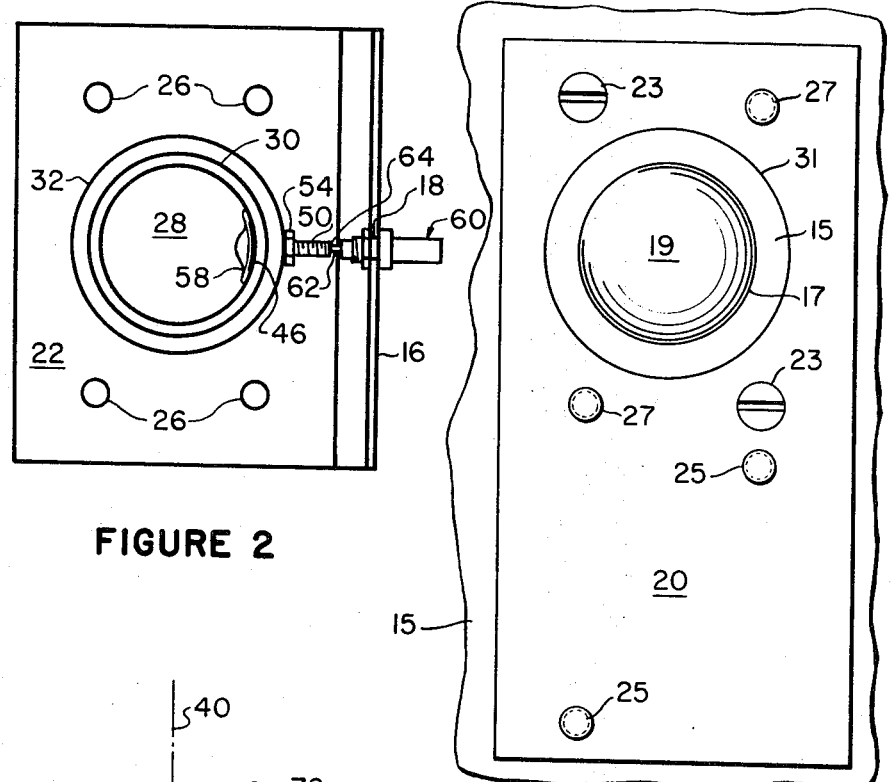
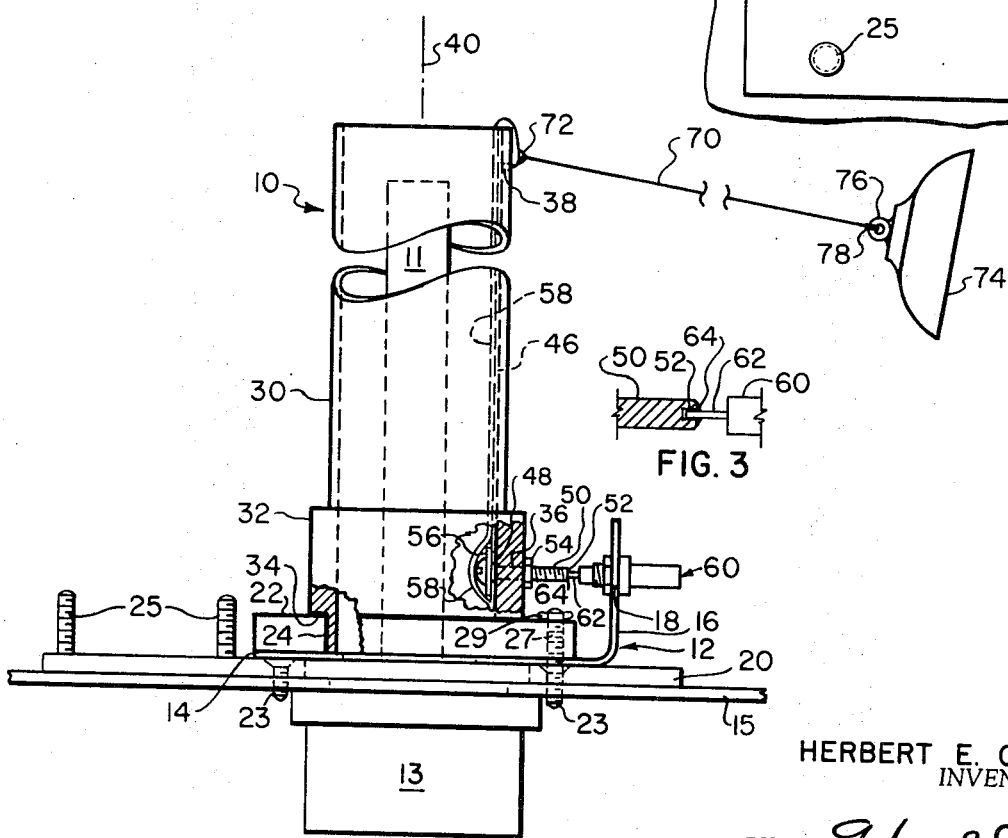
HERBERT E. CRIBB
INVENTOR.
BY
*J. M. McCoy*
*William H. King*
ATTORNEYS

United States Patent Office 3,540,056
Patented Nov. 10, 1970

3,540,056
VHF/UHF PARASITIC PROBE ANTENNA
Herbert E. Cribb, Satellite Beach, Fla., assignor to the United States of America as represented by the Administrator of the National Aeronautics and Space Administration
Filed Sept. 6, 1967, Ser. No. 666,555
Int. Cl. H01q 1/40
U.S. Cl. 343—703       1 Claim

ABSTRACT OF THE DISCLOSURE

A parasitic probe antenna which couples RF energy from a spacecraft antenna to other antennas located at remote points from the spacecraft. The parasitic probe antenna consists of a tubular member having an aluminized tape on the interior thereof for receiving RF energy from the spacecraft antenna when the tubular member is positioned over the spacecraft antenna. The radio signals received by the aluminized tape are transmitted by transmission lines to the remote antennas. The remote antennas transmit the radio signals through free space to distant buildings housing equipment used to test the spacecraft prior to launch.

---

The invention described herein was made by an employee of the United States Government and may be manufactured and used by or for the Government for governmental purposes without payment of any royalties thereon or therefor.

This invention relates generally to an antenna used on spacecrafts and, more particularly, to a parasitic probe antenna which provides protection for a spacecraft antenna and coupling of the radio-frequency (RF) energy from a spacecraft antenna to remote exterior antennas.

Prelaunch test procedures for spacecraft and boosters necessarily require that all systems and equipment be completely tested for operational reliability prior to launch of the vehicle. In order to insure complete testing, the spacecraft must be isolated in a building or clean room and the spacecraft antenna energized for transmission of radio signals from the spacecraft or booster to distant buildings housing the necessary testing equipment. In the past, the radio signals were transmitted to the distant building by using dipole antennas mounted on tripods supported by the gantry structure a specified distance from the spacecraft or booster antennas. Obviously, such an arrangement was cumbersome, consumed a large area and prevented complete freedom of access to the immediate areas surrounding the vehicle. Furthermore, there was no method of protecting the expensive and extremely fragile spacecraft antennas from damage that might be caused by personnel or objects in the vicinity of the spacecraft.

In order to overcome the disadvantages of the prior art, the instant invention contemplates a novel antenna system consisting of a parasitic probe antenna and a number of remotely located antennas for readily transmitting the radio signals received from the spacecraft antenna to the distant buildings housing the testing equipment. The parasitic probe antenna consists of a tubular member adapted to be positioned over the spacecraft antenna for protecting the same from damage.

It is an object of this invention to provide a method of coupling RF energy from a spacecraft or booster to remote exterior antennas for permitting prelaunch testing of the spacecraft.

Another object of this invention is to provide a parasitic probe antenna capable of protecting a spacecraft or booster antenna.

A more complete appreciation of the invention and many of the attendant advantages thereof will be readily apparent as the same becomes better understood by reference to the following description when considered in connection with the accompanying drawings wherein:

FIG. 1 is a side elevational view, partially in section, of the instant invention;

FIG. 2 is a top, end view of the invention as shown in FIG. 1 with the parasitic probe antenna detached from the spacecraft; and FIG. 3 is an enlarged view of a portion of FIG. 1.

FIG. 4 is a top view of the adapter plate of FIG. 1 attached to the spacecraft with the parasitic probe antenna removed.

Referring now to the drawings and more particularly to FIG. 1 wherein parasitic probe antenna 10 is shown positioned over an externally extended spacecraft antenna 11. The spacecraft antenna 11 is constructed of flexible beryllium-copper and is normally collapsed and stored in a housing 13 located inside of the spacecraft. Adjacent the housing 13, the spacecraft is provided with a skin 15 having a hole 17 through which the spacecraft antenna 11 extends. When the spacecraft antenna 11 is in the collapsed position, it is compressed like a spring and exerts pressure against a cap 19 which covers the hole 17. The cap 19 is shown in FIG. 4 and is held in place by a conventional solenoid operated latching mechanism (not shown). When the solenoid is energized, the latching mechanism releases the cap 19 and spacecraft antenna 11 automatically extends through the hole 17. The parasitic probe antenna 10 includes an attachment bracket 12 having bottom plate 14 and upright flange 16. Flange 16 has slot 18 extending downwardly from the upper edge for a purpose to be described more fully hereinafter. Opening 28 is substantially centrally located in bottom plate 14 to permit the spacecraft antenna 11 to extend through bracket 12.

A base 22 is preferably made from a phenolic material and is bonded with epoxy to the top of bottom plate 14 of bracket 12. Four apertures 26 extend through both the base 22 and bottom plate 14. Opening 24 in base 22 is slightly larger than, but substantially coincident with, opening 28 in the bottom plate 14. Tubular member 30 having open ends is preferably made from a phenolic material and is of cylindrical configuration to form a protective covering for the spacecraft antenna 11. The interior diameter of the tubular member 30 substantially is equal to that of opening 28 in bottom plate 14. One end of tubular member 30 has reinforcement 32 which provides that end of the tube with a greater wall thickness. The lower edge of reinforcement 32 has rabbet 34 in order that the tubular member 30 will fit tightly into opening 24 in base 22 and can be bonded therein by an epoxy adhesive. Aperture 36 extends through reinforcement 32 perpendicular to centerline 40 of the tubular member 30. Aperture 38 in the outer end of the tubular member 30 permits attachment of cord 70 for a purpose to become more apparent hereinafter.

Aluminized tape 46 forms a coupling antenna bonded to the interior surface of the tubular member 30. Tape 46 extends substantially the complete longitudinal length of tubular member 30 and overlies aperture 36 in reinforcement 32. Aperture 48 in tape 46 coincides with aperture 36 to receive screw 50. Bore 52 extends into the threaded end and along the centerline of screw 50, see FIG. 3. Flexible metal washer 56 mounts adjacent the head of screw 50 to insure good contact between coupling antenna 46 and screw 50 and to assist in securing antenna 46 on the interior of the tubular member 30. Nut 54 locks screw 50 and washer 56 in place in apertures 36 and 48. Protective tape 58 covers coupling antenna 46, washer 56 and the head of screw 50 to provide protection against undesirable contact with ambient atmosphere or damaging objects.

Conventional connector 60 is mounted in slot 18 in alignment with bore 52 in screw 50. As is seen more clearly in FIG. 3, dowel 62 extending from the rear of connector 60 extends into bore 52 and is soldered to screw 50 at 64 to insure conductive contact between coupling antenna 46 and the contacts of connector 60. The connector 60 connects the aluminized tape 46 to the remote exterior antennas (not shown) by means of conventional transmission lines (not shown).

Cord 70, see FIG. 1, extends through aperture 38 and is attached to tubular member 30 by knot 72. Suction cup 74 is commercially available and of conventional construction and has eye 76 extending from the rear. Cord 70 is tied to eye 76 by knot 78 to thereby securely suspend suction cup 74 from the tubular member 30. The bracket 12 is attached to the skin 15 of the spacecraft by using an adapter plate 20, as shown in FIGS. 1 and 4. The adapter plate is secured to the skin 15 with countersunk screws 23. Extending upwardly from the adapter plate 20 are first and second sets of studs 25 and 27, respectively. The bracket 12 may be located in a first position by aligning two of the apertures 26 so that the first set of studs 25 extend therethrough or in a second position by aligning two of the apertures 26 so that the second set of studs 27 extend therethrough. The bracket 12 and base 22 may then be secured in one of the desired positions by utilizing wing nuts 29 (only one shown) on the ends of the studs 25 and 27. The adapter plate 20 is also provided with an enlarged opening 31 which is arranged to be in alignment with the cap 19.

OPERATION

The parasitic probe antenna 10 is first positioned so that the first set of studs 25 extend through two of the apertures 26 in the bracket 12. The bracket 12 is held in place by tightening the wing nuts 29 on the studs 25. In this position the suction cup 74 is pressed down on top of the cap 19. When the cap 19 is released by the solenoid operated latching mechanism (not shown), the compressed spacecraft antenna 11 automatically pops out of the housing 13 and the cap 19 is prevented from being damaged due to it being caught or retained by the suction cup 74 and cord 70. After the spacecraft antenna 11 is extended, the wing nuts are removed from studs 25 and the parasitic probe antenna is moved to its second position wtih the tubular member 30 inserted over the spacecraft antenna 11. The bracket 12 of the parasitic probe antenna 11 is secured in this second position by tightening of the wing nuts 29 on the studs 27. The tubular member 30 now serves to protect the spacecraft antenna 11 from damage and the aluminized tape 46 is in a position adjacent to the spacecraft antenna 11 for receiving the RF energy therefrom. In effect, the aluminized tape 46 is coupled to the spacecraft antenna 11 even though there is a small space therebetween. Having received the RF energy or radio signal from the spacecraft antenna 11, the aluminized tape 46 transmits it by way of the connector 60 and transmission lines (not shown) to remote antennas (not shown) outside of the immediate building or clean-room which confines the spacecraft. These remote antennas then transmit the RF energy or radio signal to distant buildings where the testing equipment for the spacecraft is housed.

Obviously many modifications and variations of the subject invention are possible in light of the above teachings. It is therefore to be understood that, within the scope of the appended claim, the invention may be practiced otherwise than as specifically described.

What is claimed as new and desired to be secured by Letters Patent of the United States is:

1. A parasitic probe antenna adapted to couple RF energy from a spacecraft antenna to remote, external antennas, comprising:
   (A) an attachment bracket adapted to be secured to the skin of a spacecraft;
   (B) an opening in said attachment bracket;
   (C) a tubular member having open ends;
   (D) said tubular member being attached to said attachment bracket with one of said open ends in alignment with said opening;
   (E) said attachment bracket and tubular member adapted to be positioned over the spacecraft antenna;
   (F) the other open end of said attachment bracket permitting the RF energy to radiate into free space;
   (G) an antenna element consisting of an aluminized tape attached to the interior surface of said tubular member and adapted to be positioned in parallel relationship with the spacecraft antenna; and
   (H) connector means on said attachment bracket for connecting said antenna element to the remote, external antennas.

References Cited

UNITED STATES PATENTS

| | | | |
|---|---|---|---|
| 2,490,782 | 12/1949 | Collup. | |
| 2,774,811 | 12/1956 | Shanok et al. | 343—873 X |
| 2,988,740 | 6/1961 | Albanese | 343—703 |
| 3,029,430 | 4/1962 | Jones | 343—703 |
| 3,286,264 | 11/1966 | Miley | 343—703 |

HERMAN KARL SAALBACH, Primary Examiner

T. J. VEZEAU, Assistant Examiner

U.S. Cl. X.R.

343—873